(12) United States Patent
Tanida et al.

(10) Patent No.: US 10,844,212 B2
(45) Date of Patent: Nov. 24, 2020

(54) AQUEOUS EMULSION COMPOSITION

(71) Applicant: KURARAY CO., LTD., Kurashiki (JP)

(72) Inventors: Tatsuya Tanida, Tainai (JP); Keisuke Morikawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 258 days.

(21) Appl. No.: 15/739,911

(22) PCT Filed: Jun. 24, 2016

(86) PCT No.: PCT/JP2016/003070
§ 371 (c)(1),
(2) Date: Dec. 26, 2017

(87) PCT Pub. No.: WO2017/002349
PCT Pub. Date: Jan. 5, 2017

(65) Prior Publication Data
US 2018/0186993 A1    Jul. 5, 2018

(30) Foreign Application Priority Data

Jun. 30, 2015 (JP) .................. 2015-132092

(51) Int. Cl.
*C08L 31/04* (2006.01)
*C09D 7/65* (2018.01)
(Continued)

(52) U.S. Cl.
CPC .............. *C08L 31/04* (2013.01); *C08F 2/30* (2013.01); *C08F 8/00* (2013.01); *C08F 218/08* (2013.01);
(Continued)

(58) Field of Classification Search
CPC ........ C08F 261/04; C08F 216/18; C08F 2/30; C08F 8/00; C08F 218/08; C08L 31/04;
(Continued)

(56) References Cited

U.S. PATENT DOCUMENTS 5,545,684 A   8/1996  Jakob et al.
6,221,952 B1 * 4/2001  Nakamae ............... C08J 3/03
                                          524/503
6,472,470 B1  10/2002 Fujiwara et al.

FOREIGN PATENT DOCUMENTS

CN     104277722 A    1/2015
EP     0 237 643 A2   9/1987
(Continued)

OTHER PUBLICATIONS

Extended European Search Report dated Feb. 13, 2019 in the corresponding European Patent Application No. 16817460.5 citing documents AO-AQ therein, 8 pages.
(Continued)

*Primary Examiner* — Ronald Grinsted
(74) *Attorney, Agent, or Firm* — Oblon, McClelland, Maier & Neustadt, L.L.P.

(57) ABSTRACT

The present invention provides an aqueous emulsion composition excellent in heat resistance, water resistance, hot water resistance, boiling water resistance, and viscosity stability and also excellent in stain resistance. The present invention relates to an aqueous emulsion composition including an aqueous emulsion (D) and a cyclic acid anhydride (E). The aqueous emulsion (D) includes a polymer (X) having an ethylenically unsaturated monomer (B), a polyvinyl alcohol resin (A), and water. At least one selected from the polyvinyl alcohol resin (A) and the polymer (X) has, in a main chain thereof, a structural unit derived from a monomer (C) represented by the following formula (I), (II), (III), or (IV).

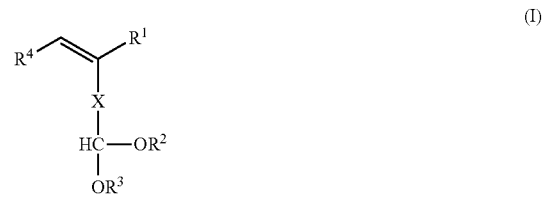

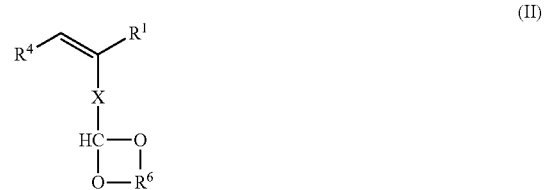

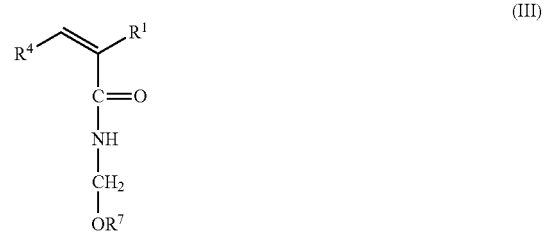

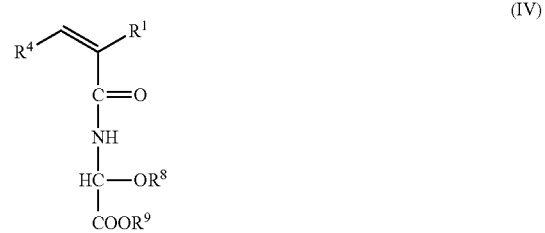

(The definitions of the symbols in the formulae are omitted.)

12 Claims, No Drawings

| (51) | Int. Cl. | |
|---|---|---|
| | C08F 2/30 | (2006.01) |
| | C08F 8/00 | (2006.01) |
| | C08F 218/08 | (2006.01) |
| | C08F 261/04 | (2006.01) |
| | C08G 81/00 | (2006.01) |
| | C08K 5/092 | (2006.01) |
| | C08L 33/12 | (2006.01) |
| | C08L 35/00 | (2006.01) |
| | C09D 5/02 | (2006.01) |
| | C09D 131/04 | (2006.01) |
| | C09D 133/12 | (2006.01) |
| | D21H 17/36 | (2006.01) |
| | D21H 19/60 | (2006.01) |
| | D21H 21/14 | (2006.01) |
| | D21H 21/16 | (2006.01) |
| | D21H 21/18 | (2006.01) |
| | D21H 19/20 | (2006.01) |
| | C09J 9/00 | (2006.01) |
| | C09J 131/04 | (2006.01) |
| | C09J 133/12 | (2006.01) |
| | D21H 17/00 | (2006.01) |

(52) U.S. Cl.
 CPC ............ *C08F 261/04* (2013.01); *C08G 81/00* (2013.01); *C08K 5/092* (2013.01); *C08L 33/12* (2013.01); *C08L 35/00* (2013.01); *C09D 5/02* (2013.01); *C09D 5/022* (2013.01); *C09D 7/65* (2018.01); *C09D 131/04* (2013.01); *C09D 133/12* (2013.01); *C09J 9/00* (2013.01); *C09J 131/04* (2013.01); *C09J 133/12* (2013.01); *D21H 17/36* (2013.01); *D21H 17/72* (2013.01); *D21H 19/20* (2013.01); *D21H 19/60* (2013.01); *D21H 21/14* (2013.01); *D21H 21/16* (2013.01); *D21H 21/18* (2013.01); *C08L 2201/08* (2013.01); *C08L 2201/52* (2013.01); *C08L 2205/03* (2013.01)

(58) Field of Classification Search
 CPC ...... C08L 33/12; C08L 35/00; C08L 2201/08; C08L 2201/52; C08L 2205/03; C09D 7/65; C09D 5/02; C09D 5/022; C09D 131/04; C09D 133/12; C08G 81/00; C08K 5/092; C09J 9/00; C09J 131/04; C09J 133/12; D21H 17/36; D21H 17/72; D21H 19/20; D21H 19/60; D21H 21/14; D21H 21/16; D21H 21/18
 USPC ......................................................... 524/112
 See application file for complete search history.

(56) References Cited

FOREIGN PATENT DOCUMENTS

| EP | 1 908 798 A1 | 4/2008 |
|---|---|---|
| JP | 47-41727 A | 10/1972 |
| JP | 52-50360 A | 4/1977 |
| JP | 55-12173 A | 1/1980 |
| JP | 62-195036 A | 8/1987 |
| JP | 8-60116 A | 3/1996 |
| JP | 10-121017 A | 5/1996 |
| JP | 10-231330 A | 9/1998 |
| JP | 11-106727 A | 4/1999 |
| JP | 11-269235 A | 10/1999 |
| JP | 2001-123138 A | 5/2001 |
| JP | 2003-517499 A | 5/2003 |
| JP | 2005-126544 A | 5/2005 |
| JP | 2008-184495 A | 8/2008 |
| JP | 4772175 B2 | 9/2011 |
| WO | WO 2016/013220 A1 | 1/2016 |

OTHER PUBLICATIONS

International Search Report dated Sep. 13, 2016, in PCT/JP2016/003070 filed Jun. 24, 2016.
Extended European Search Report dated Feb. 13, 2019 in the corresponding European Patent Application No. 16817460.5, 8 pages.

\* cited by examiner

AQUEOUS EMULSION COMPOSITION

TECHNICAL FIELD

The present invention relates to an aqueous emulsion composition excellent in heat resistance, water resistance, hot water resistance, boiling water resistance, and viscosity stability and also excellent in stain resistance.

BACKGROUND ART

Vinyl acetate polymer resin-containing, aqueous emulsions obtained by polymerizing vinyl acetate with the aid of a polyvinyl alcohol (which may hereinafter be abbreviated as "PVA") serving as a protective colloid have been conventionally widely used, for example, in adhesives for paper processing, woodworking, and fiber processing and m paints. In particular, it is a widespread practice to use a PVA as a protective colloid in combination with a carboxy group-containing unsaturated monomer when water resistance or bonding property is required.

However, a coating obtained from an aqueous emulsion prepared as described above has the disadvantages of having low heat resistance and being insufficient in properties such as hot water resistance and boiling water resistance, although such a coating shows improvement in bonding property and water resistance.

Several solutions have been proposed to overcome the above disadvantages (Patent Literatures 1 to 5). For example, Patent Literature 1 proposes an emulsion adhesive containing a polyaldehyde capable of releasing an aldehyde group in an acid medium. However this approach, although being capable of yielding high water resistance, still cannot achieve sufficient viscosity stability.

Patent Literature 2 proposes an emulsion prepared by copolymerization of a vinyl acetate monomer and N-methylol acrylamide. However, this approach fails to achieve sufficient water resistance at low temperatures and is also unsatisfactory in viscosity stability Patent Literature 3 proposes emulsion-polymerizing vinyl acetate or emulsion-copolymerizing vinyl acetate and a (meth)acrylic acid ester with the aid of a modified PVA incorporating ethylene and serving as a protective colloid (this PVA may be simply referred to as "ethylene-modified PVA" hereinafter). With these techniques, some degree of improvement in heat resistance and hot water resistance can be achieved indeed; however, the improvement in heat resistance and hot water resistance is still insufficient, and satisfactory results cannot be obtained for final bond strength or boiling water resistance.

Patent Literature 4 proposes using an ethylene-modified PVA as a protective colloid in combination with a (co)polymer of a carboxy group-containing unsaturated monomer or with an amide-modified PVA for polymerization of vinyl acetate. However, this approach still cannot achieve sufficient heat resistance either.

Patent Literature 5 proposes an aqueous dispersion containing polymer particles having an acetal or aldehyde functional group. However, a coating obtained by this approach has low strength and is still insufficient in heat resistance.

Furthermore, in Patent Literatures 1 and 2, a strong acid, aluminum metal or the like is added as a catalyst for crosslinking reaction. The addition of such a catalyst is not preferred, since the catalyst can accelerate strength deterioration of an adhesive layer and an adherend such as wood and cause staining of the adhesive layer (glue line).

CITATION LIST

Patent Literature

Patent Literature 1: JP 8(1996)-60116 A
Patent Literature 2: JP 10(1998)-121017 A
Patent Literature 3: JP 11(1999)-106727 A
Patent Literature 4: JP 2001-123138 A
Patent Literature 5: JP 2003-517499 A

SUMMARY OF INVENTION

Technical Problem

It is therefore an object of the present invention to provide an aqueous emulsion composition excellent in heat resistance, water resistance, hot water resistance, boiling, water resistance, and viscosity stability and also excellent in stain resistance.

Solution to Problem

As a result of intensive studies, the present inventors have found that an aqueous emulsion composition can be a solution to the above problems when the following conditions are satisfied: the aqueous emulsion composition includes an aqueous emulsion (D) and a cyclic acid anhydride (E); the aqueous emulsion (D) includes a polymer (X) having an ethylenically unsaturated monomer (B), a polyvinyl alcohol resin (A), and water; and at least one selected from the polyvinyl alcohol resin (A) and the polymer (X) has, in a main chain thereof, a structural unit derived from a monomer (C) represented by the following formula (I), (II), (III), or (IV). The present inventors have completed the present invention based on this finding.

(I)

wherein: $R^1$ is a hydrogen atom, a linear alkyl group having 1 to 8 carbon atoms, or $-CH_2-COOM$, where M is a hydrogen atom, a methyl group, an alkali metal, or an ammonium group; $R^2$ and $R^3$ are the same or different and are each an alkyl group having 1 to 8 carbon atoms or an alkylcarbonyl group having 2 to 8 carbon atoms; $R^4$ is a hydrogen atom or $-COOM$, where M is a hydrogen atom, a methyl group, an alkali metal, or an ammonium group; and X is $-(CH_2)_n-$, $-CO-NH-(CH_2)_n-$, $-NH-CO-(CH_2)_n-$, $-CO-(CH_2)_n-$, $-CO-O-(CH_2)_n-$, $-O-CO-(CH_2)_n-$, $-NR^5-CO-(CH_2)_n-$, or $-CO-NR^5-(CH_2)_n-$, where $R^5$ is a hydrogen atom or an alkyl group having 1 to 4 carbon atoms and n is an integer of 0 to 8,

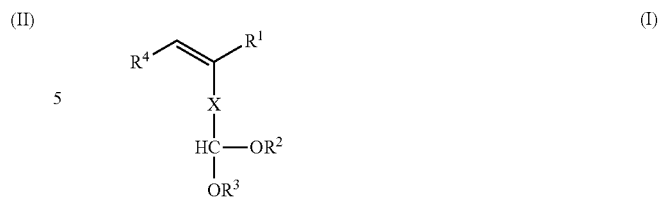

(I)

wherein: $R^1$ is a hydrogen atom, a linear alkyl group having 1 to 8 carbon atoms, or —$CH_2$—COOM, where M is a hydrogen atom, a methyl group, an alkali metal, or an ammonium group; $R^2$ and $R^3$ are the same or different and are each an alkyl group having 1 to 8 carbon atoms or an alkylcarbonyl group having 2 to 8 carbon atoms; $R^4$ is a hydrogen atom or —COOM, where M is a hydrogen atom, a methyl group, an alkali metal, or an ammonium group; and X is —$(CH_2)_n$—, —CO—NH—$(CH_2)_n$—, —NH—CO—$(CH_2)_n$—, —CO—$(CH_2)_n$—, —CO—O—$(CH_2)_n$—, —O—CO—$(CH_2)_n$—, —$NR^5$—CO—$(CH_2)_n$—, or —CO—$NR^5$—$(CH_2)_n$—, where $R^5$ is a hydrogen atom or an alkyl group having 1 to 4 carbon atoms and n is an integer of 0 to 8,

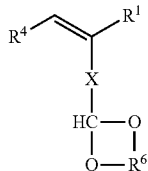

(II)

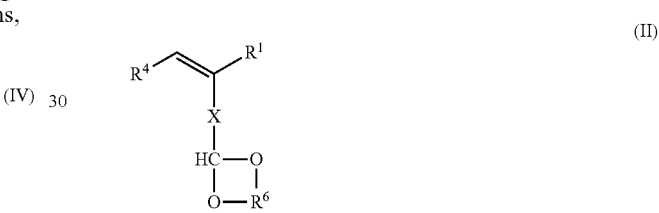

(II)

wherein $R^1$, $R^4$, and X are as defined above, $R^6$ is —$(CH_2$—$CH_2)_m$—, and m is an integer of 1 to 3,

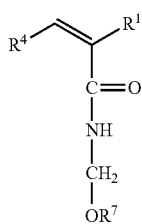

(III)

(III)

wherein $R^1$ and $R^4$ are as defined above, $R^7$ is a hydrogen atom or a linear alkyl group having 1 to 6 carbon atoms,

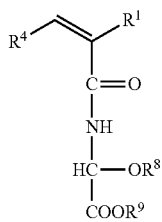

(IV)

(IV)

wherein $R^1$ and $R^4$ are as defined above, and $R^8$ and $R^9$ are the same or different and are each a hydrogen atom or a linear alkyl group having 1 to 6 carbon atoms.

Advantageous Effects of Invention

The present invention can provide an aqueous emulsion composition excellent in heat resistance, water resistance, hot water resistance, boiling water resistance, and viscosity stability and also excellent in stain resistance.

DESCRIPTION OF EMBODIMENTS

Hereinafter the present invention will be described in detail.

An aqueous emulsion composition according to the present invention includes an aqueous emulsion (D) and a cyclic add anhydride (E), the aqueous emulsion (D) includes a polymer (X) having an ethylenically unsaturated monomer (B), a polyvinyl alcohol resin (A), and water, and at least one selected from the polyvinyl alcohol resin (A) and the polymer (X) has, in a main chain thereof, a structural unit derived from a monomer (C) represented by the folk ring formula (I) (II), (III), or (IV). The term "(meth)acryl" as used herein collectively refers to "acryl" and "methacryl". Other similar expressions are defined in the same manner.

wherein $R^1$ and $R^4$ are as defined above, and $R^8$ and $R^9$ are the same or different and are each a hydrogen atom or a linear alkyl group having 1 to 6 carbon atoms.

The aqueous emulsion composition according to the present invention can be produced, for example, by a production method including the steps of [1] polymerizing (for example, emulsion-polymerizing) an ethylenically unsaturated monomer (B) and a monomer (C) represented by the above formula (I), (II), (III), or (IV) in the presence of a polyvinyl alcohol resin (A) to obtain an aqueous emulsion (D); and [2] mixing the aqueous emulsion (D) and a cyclic acid anhydride (E).

In the step [1], the ethylenically unsaturated monomer (B) and the monomer (C) are copolymerized with the aid of the PVA resin (A) to obtain the aqueous emulsion (D) including the polymer (X), the PVA resin (A), and water. The aqueous emulsion (D) according to the present invention can be produced, for example, by emulsion-polymerizing the ethylenically unsaturated monomer (B) and the monomer (C) using a commonly-known process in the presence of the PVA resin (A). The amount of the monomer (C) used is preferably 0.01 to 10 mass % and more preferably 0.05 to 5 mass % relative to the ethylenically unsaturated monomer (B). The temperature during polymerization varies depending on the polymerization catalyst used, but is typically 20 to 100° C., preferably 40 to 90° C., and more preferably 50 to 90° C. The reaction time is not particularly limited, and may be adjusted as appropriate depending on the amounts of the components added and the reaction temperature.

The aqueous emulsion composition according to the present invention can also be produced, for example, by a production method including the steps of: [1'] polymerizing (for example, emulsion-polymerizing) an ethylenically unsaturated monomer (B) in the presence of a PVA resin (A) having, in a main chain thereof, a structural unit derived from a monomer (C) represented by the above formula (I), (II), (III), or (IV) to obtain an aqueous emulsion (D); and [2'] mixing the aqueous emulsion (D) and a cyclic acid anhydride (E). The conditions employed in the steps [1'] and [2'], such as the amounts of the components used and the polymerization conditions, are as described for the steps [1] and [2].

The symbols in the formulae (I) to (IV) will be described below. The same symbols (such as $R^1$) used in two or more different formulae (for example, the formula (I) and formula (II) in the present invention may represent the same or different things in the different formulae without departing from the scope of the definitions of the symbols.

Examples of the linear alkyl group having 1 to 8 carbon atoms which is represented by $R^1$ include methyl, ethyl, n-propyl, n-butyl, n-pentyl, n-hexyl, n-heptyl, and n-octyl groups, and a methyl group is preferred. Examples of the alkali metal represented by M in $R^1$ or $R^4$ include lithium, sodium, potassium, rubidium, and cesium. Lithium, sodium, or potassium is preferred, and sodium or potassium is more preferred.

Examples of the alkyl group having 1 to 8 carbon atoms which is represented by $R^2$ or $R^3$ include methyl, ethyl, n-propyl, isopropyl, n-butyl, isobutyl, sec-butyl, tert-butyl, n-pentyl, isopentyl, sec-pentyl, neopentyl, tert-pentyl, 1-ethylpropyl, n-hexyl, isohexyl, 1,1-dimethylbutyl, 2,2-dimethylbutyl, 3,3-dimethylbutyl, 2-ethylbutyl, n-heptyl, and n-octyl groups. Among these, groups having 1 to 6 carbon atoms are preferred. Examples of the alkylcarbonyl group represented by $R^2$ or $R^3$ include acetyl, propanoyl, butanoyl, pentanoyl, hexanoyl, heptanoyl, and octanoyl groups. An acetyl, propanoyl, butanoyl, pentanoyl, or hexanoyl group is preferred.

X is —$(CH_2)_n$—, —CO—NH—$(CH_2)_n$—, —NH—CO—$(CH_2)_n$—, —CO—$(CH_2)_n$—, —CO—O—$(CH_2)_m$—, —O—CO—$(CH_2)_n$—, —$NR^5$—CO—$(CH_2)_n$, or —CO—$NR^5$—$(CH_2)_n$—, and is preferably —$(CH_2)_n$—.

In X, n is, preferably 0, 1, 2, 3, 4, 5, or 6.

Examples of the alkyl group having 1 to 4 carbon atoms which is represented by $R^5$ include methyl, ethyl, n-propyl, isopropyl, n-butyl, isobutyl, sec-butyl, and tert-butyl groups.

In $R^6$, m is preferably 1 or 2 and more preferably 1.

Examples of the linear alkyl group having 1 to 6 carbon atoms which is represented by $R^7$, $R^8$, or $R^9$ include linear alkyl groups having 1 to 6 carbon atoms which are selected from the linear alkyl groups having 1 to 8 carbon atoms which are mentioned as examples for $R^1$.

Examples of the monomer (C) represented by the formula (I) or (II) include, but are not limited to, the following acetal derivatives of aliphatic aldehydes having an ethylenically unsaturated double bond: acetal derivatives of (meth)acrolein such as (meth)acrolein dimethyl acetal, (meth)acrolein diethyl acetal, 2-vinyl-1,3-dioxolane, and 2-isopropenyl-1,3-dioxolane; acetal derivatives of 3-methyl-3-butenal such as 3-methyl-3-butenal dimethyl acetal, 3-methyl-3-butenal diethyl acetal, and 2(2-methyl-2-propertyl)-1,3-dioxolane; acetal derivatives of 3-butenal such as 3-butenal dimethyl acetal, 3-butenal diethyl acetal, and 2-(2-propenyl)-1,3-dioxolane; acetal derivatives of 4-pentenal such as 4-pentenal dimethyl acetal, 4-pentenal diethyl acetal, and 2-(3-butenyl)-1,3-dioxolane; acetal derivatives of 5-hexenal such as 5-hexenal dimethyl acetal, 5-hexenal diethyl acetal and 2(5-pentenyl)-1,3-dioxolane; acetal derivatives of 6-heptenal such as 6-heptenal dimethyl acetal, 6-heptenal diethyl acetal, and 2-(6-hexenynl)-1,3-dioxolane; and acetal derivatives of 7-octenal such as 7-octenal dimethyl acetal, 7-octenal diethyl acetal, 2-(1-heptenyl)-1,3-dioxolane, and 2-(6-heptenyl)-1,3-dioxolane.

Examples of the monomer (C) represented by the formula (I) or (II) further include: dialkoxyalkyl (meth)acrylamide compounds such as N-2,2-dimethoxyethyl(meth), acrylamide, N-(2,2-diethoxyethyl)(meth)acrylamide, N-(2,2-dlisopropoxyethyl)(meth)acrylamide, N-2,2-dibutoxyethyl)(meth)acrylamide, N-(2,2-di-t-butoxyethyl)(meth)acrylamide, N-(3,3-dimethoxypropyl)(meth)acrylamide, N-(3,3-diethoxypropyl)meth)acrylamide, N-(3,3-dlisopropoxypropyl)(meth)acrylamide, N-(3,3-dibutoxypropyl)(meth)acrylamide, N-(3,3-di-t-butoxypropyl)(meth)acrylamide, N-(4,4-dimethoxybutyl)(meth)acrylamide, N-(4,4-diethoxybutyl)(meth)acrylamide, N-(4,4-diisopropoxybutyl)(meth)acrylamide, N-(4,4-dibutoxybutyl)(meth)acrylamide, N-(4,4-di-t-butoxybutyl)(meth)acrylamide, N-methyl-N-(2,2-dimethoxyethyl)(meth)acrylamide, N-methyl-N-(2,2-diethoxyethyl)(meth)acrylamide, N-methyl-N-(2,2-diisopropoxyethyl)(meth)acrylamide, N-methyl-N-(2,2-dibutoxyethyl)(meth)acrylamide, and N-meth N-(2,2-di-t-butoxyethyl)(meth)acrylamide; butenoic acids having two alkoxy groups per molecule such as 4-{2,2-dimetboxyethyl)amino}-4-oxo-2-butenoic acid, 4-{(2,2-diethoxyethy)amino}-4-oxo-2-butenoic acid, 4-{(2,2-diisopropoxyethyl)amino}-4-oxo-2-butenoic acid, and 4-{(2,2-dibutoxyethyl)amino}-4-oxo-2-buteonic acid; pentenes having two alkoxy groups per molecule such as 5,5-dimethoxy-3-oxo-1-pentene, 5,5-diethoxy-3-oxo-1-pentene, 5,5-diisopropoxy-3-oxo-1-pentene, and 5,5-dibutoxy-3-oxo-1-pentene; butanoic acids having two alkoxy groups per molecule such as 4-{(2,2-dimethoxyethyl)amino}-4-oxo-3-methylene-butanoic acid, 4-{(2,2-diethoxyethyl)amino}-4-oxo-3-methylene-butanoic acid, 4-{(2,2-diisopropoxyethyl)amino}4-oxo-3-methylene-butanoic acid, and 4-{(2,2-dibutoxyethyl)amino}-4-oxo-3-methylene-butanoic acid; propenoic acid compounds having two alkoxy groups per molecule such as 3-[N-(2,2-dimethoxyethyl)carbamoyl]propenoic acid, 3-[N-(2,2-diethoxyethyl)carbamoyl]propenoic acid, 3-[N-(2,2-diisopropoxyethyl)carbamoyl]propenoic acid, 3-[N-(2,2-dibutoxyearyl)carbamoyl]propenoic acid, and 3-[N-(2,2-di-t-butoxyethyl)carbamoyl]propenoic acid; propenoic acid ester compounds having two alkoxy groups per molecule such as methyl 3-[N-(2,2-dimethoxyethyl)carbamoyl]propenoate, methyl 3-[N-(2,2-diethoxyethyl)carbamoyl]propenoate, methyl 3-[N-(2,2-diisopropoxyethyl)carbamoyl]propenoate, methyl 3-[N-(2,2-dibutoxyethyl)carbamoyl]propenoate, and methyl 3-[N-(2,2-di-t-butoxyethyl)carbamoyl]propenoate; acetal derivatives of dialkoxyalkyl (meth)acrylates such as 2,2-dimethoxyethyl (meth)acrylate, 2,2-diethoxyethyl (meth)acrylate, 2,2-diisopropoxyethyl (meth)acrylate, and 2,2-dibutoxyethyl (meth)acrylate; alkyl (meth)acrylamide compounds; and acetal derivatives of aliphatic aldehydes having an unsaturated double bond, such as acetal derivatives of butenoic acids, acetal derivatives of pentenes, and acetal derivatives of butanoic acids. The number of carbon atoms in an alkoxy group contained in the compounds mentioned above is preferably 1 to 6 and more preferably 1 to 4. The number of the carbon atoms in an alkyl group of the alkyl (meth)acrylamide compounds or alkyl (meth)acrylates is preferably 1 to 6, more preferably 1 to 4, and more preferably 1 to 2.

Examples of the monomer (C) represented by the formula (III) or (IV) include, but are not limited to, the following compounds: N-substituted unsaturated amides such as N-methylol (meth)acrylamide, N-methylol maleimide, N-methylol maleamic acid, and N-methylol maleamic acid esters (e.g., methyl N-methylol maleamate); alkoxymethyl group containing (meth)acrylamides such as methoxymethyl (meth)acrylamide, ethoxymethyl (meth)acrylamide, and butoxymethyl (meth)acrylamide; and acrylamide/glyoxylic acid condensate and ethers and esters thereof, such as (meth)acrylamidoglyoxylic acid, methyl acrylamidoglyoxylate, and butyl acrylamidoglyoxylate.

In the aqueous emulsion according to the present invention, one of the above unsaturated monomers (C) may be used alone, or two or more thereof may be used in combination.

In the emulsion polymerization, the amount of the monomer (C) unit represented by the above formula (I), (II), (III), or (IV) is preferably 0.01 to 10 mass % and more preferably 0.05 to 5 mass % with respect to the total amount of the ethylenically unsaturated monomer (B) unit. If the amount of the monomer (C) unit represented by the formula (I), (II), (III), or (IV) is less than 0.01 mass %, the resulting heat resistance, water resistance, hot water resistance, and boiling water resistance are insufficient. If the amount of the monomer (C) unit is more than 10 mass %, the polymerization is difficult.

The ethylenically unsaturated monomer (B) used for copolymerization with the monomer (C) in the present invention is not particularly limited as long as the effect of the present invention is not impaired. Examples of the ethylenically unsaturated monomer (B) include a vinyl ester monomer, a (meth)acrylic acid ester monomer, an α,β-unsaturated mono or dicarboxylic acid monomer, a diene monomer, an olefin monomer, a (meth)acrylamide monomer, a nitrile monomer, an aromatic vinyl monomer, a heterocyclic vinyl monomer, a vinyl ether monomer, an allyl monomer, and a polyfunctional acrylate monomer. One of these monomers may be used alone, or two or more thereof may be used in combination. Among these monomers, at least one unsaturated monomer selected from the group consisting of a vinyl ester monomer and a diene monomer is preferred, and a vinyl ester monomer is more preferred.

Examples of the vinyl ester monomer include, but are not limited to, vinyl formate, vinyl acetate, vinyl propionate, vinyl butyrate, vinyl isobutyrate, vinyl pivalate, vinyl versatate, vinyl cinnamate, vinyl crotonate, vinyl decanoate, vinyl hexanoate, vinyl octanoate, vinyl isononanoate, vinyl trimethylacetate, vinyl 4-tert-butylbenzoate, vinyl 2-ethylhexanoate, vinyl caproate, vinyl caprylate, vinyl laurate, vinyl palmitate, vinyl stearate, vinyl oleate, and vinyl benzoate, vinyl acetate is particularly preferred from the industrial point of view. Examples of the (meth)acrylic acid ester monomer include, but are not limited to, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, octadecyl (meth)acrylate, 2-hydroxyethyl (meth)acrylate, 2-methoxyethyl (meth)acrylate, and 2-(dimethylamino)ethyl (meth)acrylate. Examples of the α,β-unsaturated mono or dicarboxylic acid, monomer include, but are not limited to, (meth)acrylic acid, crotonic acid, isocrotonic acid, citraconic acid, itaconic acid, maleic acid, maleic anhydride, and fumaric acid. Examples of the diene monomer include, but are not limited to, conjugated dienes such as butadiene, isoprene, and chloroprene.

Examples of the olefin monomer include, but are not limited to: monoolefinic compounds such as ethylene, propylene, 1-butene, and isobutene; and halogenated olefinic compounds such as vinyl chloride, vinyl bromide, vinylidene chloride, vinyl fluoride, and vinylidene fluoride. Examples of the (meth)acrylamide monomer include, but are not limited to, (meth)acrylamide, N-methyl (meth)acrylamide, N-ethyl (meth)acrylamide, N,N-dimethyl (meth)acrylamide, diacetone (meth)acrylamide, and N,N-dimethylaminopropyl (meth)acrylamide. Examples of the nitrile monomer include, but are not limited to, (meth)acrylonitrile. Examples of the aromatic vinyl monomer include, but are not limited to, styrene, α-methylstyrene, p-methylstyrene, chlorostyrene, α-butoxystyrene, vinylnaphthalene, vinylbipbenyl, and 1-ethyl-2-vinylbenzene. Examples of the heterocyclic vinyl monomer include, but are not limited to, vinylpyrrolidone. Examples of the vinyl ether monomer include, but are not limited to, methyl, vinyl ether, n-propyl vinyl ether, i-propyl vinyl ether, n-butyl vinyl ether, i-butyl vinyl, ether, t-butyl vinyl ether, dodecyl vinyl ether, and stearyl vinyl ether. Examples of the allyl monomer include, but are not limited to, allyl acetate, allyl chloride, allyl sulfonate, diallyl phthalate, triallyl cyanurate, and triallyl isocyananurate. Examples of the polyfunctional acrylate monomer include, but are not limited to, pentaerythritol triacrylate, pentaerythritol tetraarrylate, pentaerythritol hexaacrylate, and trimethylolpropane triacrylate. Furthermore, vinyl compounds such as vinylphosphonic acid, vinylsulfonic acid, and salts thereof can also be used as the ethylenically unsaturated monomer. One of the above monomers may be used alone, or two or more thereof may be used in combination.

The degree of saponification of the PVA resin (A) used as a protective colloid in the present invention is typically 70 to 99.9 mol % and preferably 75 to 99.5 mol %. If the degree of saponification is less than 70 mol %, the effect of the resin as a protective colloid is so small that a stable aqueous emulsion cannot be obtained. If the degree of saponification is more than 99.9 mol %, the viscosity of the resulting aqueous emulsion is so temperature-dependent that the object of the present invention cannot be achieved. PVA resins having different degrees of saponification may be used in combination as long as the degrees of saponification are within the above range. The degree of saponification is determined by a method specified in JIS K 6726 (1994).

The PVA resin (A) may be an unmodified PVA or a modified PVA as long as the degree of saponification of the PVA is within the above range. Examples of the modified PVA include: modified PVAs having, in the main chain thereof, a structural unit derived from the monomer (C) represented by the above formula (I), (II), (III), or (IV); anion-modified PVAs such as sulfonic add group-modified PVAs and carboxylic acid group-modified PVAs; cation-modified PVAs such as quaternary amine group-modified PVAs; amide-modified PVAs acetoacetyl group-modified PVAs; diacetone acrylamide-modified PVAs; and ethylene-modified PVAs. One of these may be used alone, or two or more thereof may be used in combination. Preferred among the above PVAs is at least one PVA selected from the group consisting of an unmodified PVA, a modified PVA having in the main chain thereof a structural unit derived, from the monomer (C) represented by the above formula (I), (II), (III), or (IV), an ethylene-modified PVA, and an anion-modified PVA such as a carboxylic acid group-modified PVA. The content of the modifying group is not particularly limited and may be 0.5 to 10 mol %.

The viscosity-average degree of polymerization (which may be simply referred to as "degree of polymerization" hereinafter) of the PVA resin (A) may be within a range generally employed for emulsion polymerization. The degree of polymerization is preferably 300 to 4000, because the degree of polymerization of 300 or more leads to adequate stability during emulsion polymerization, and the degree of polymerization of 4000 or less prevents the solution viscosity from becoming excessively high during emulsion polymerization and thus makes stirring and heat removal easy. The degree of polymerization is determined by a method specified in JIS K 6726 (1994). Specifically, when the degree of saponification is less than 99.5 mol %, the PVA is saponified to or above a degree of saponification of 99.5 mol %, and the viscosity-average degree of polymerization (P) of the saponified PVA is determined by the following equation using a limiting viscosity [η] (liter/g) measured in water at 30° C.

$$P=([\eta]\times 10^4/8.29)^{(1/0.82)}$$

The amount of the PVA resin (A) used is typically 2 to 20 mass % and preferably 3 to 10 mass % with respect to the total amount of the ethylenically unsaturated monomer (B) (e.g., vinyl acetate). If the amount of the PVA resin (A) is less than 2 mass %, sufficient stability may not be obtained during emulsion polymerization, while if the amount is more than 20 mass %, a coating formed using the resulting aqueous emulsion may have low water resistance, hot water resistance, and boiling water resistance, or the temperature dependence of viscosity may be high.

The aqueous emulsion according to the present invention may contain an alkali metal compound (F). The alkali metal compound (F) is not particularly limited as long as it contains an alkali metal (such as sodium, potassium, rubidium, or cesium). The alkali metal compound (F) may be in the form of an alkali metal ion (f-1) or may be an alkali metal-containing compound (f-2), The content of the alkali metal compound (F) (calculated as alkali metal) can be selected as appropriate depending on the type of the alkali metal compound used. The content of the alkali metal compound (F) (calculated as alkali metal) is preferably 100 to 15000 ppm, more preferably 120 to 12000 ppm, and most preferably 150 to 8000 ppm with respect to the total weight of the emulsion (calculated as solids). If the content of the alkali metal compound (F) is less than 100 ppm, the stability of emulsion polymerization for producing the aqueous emulsion may be low, while if the content is more than 15000 ppm, a coating formed from the aqueous emulsion may be stained. This is why it is not preferable that the content be less than 100 ppm or more than 15000 ppm. The content of the alkali metal compound (F) may be measured by an ICP optical emission spectrometer.

Specific examples of the alkali metal-containing compound (f-2) include weakly basic alkali metal compounds and strongly basic alkali metal compounds (such as alkali metal hydroxides and alkali metal alkoxides), and weakly basic alkali metal compounds are preferred. One of these alkali metal compounds may be used alone, or two or more thereof may be used in combination.

Examples of the weakly basic alkali metal compounds include alkali metal carbonates (such as sodium carbonate, potassium carbonate, rubidium carbonate, and cesium carbonate), alkali metal bicarbonates (such as sodium hydrogen carbonate and potassium hydrogen carbonate), alkali metal phosphates (such as sodium phosphate and potassium phosphate), alkali metal carboxylates (such as sodium acetate, potassium acetate, and cesium acetate), alkali metal sulfates (such as sodium sulfate, potassium sulfate, and cesium sulfate), alkali metal halides (such as cesium chloride, cesium iodide, potassium chloride, and sodium chloride), and alkali metal nitrates (such as sodium nitrate, potassium nitrate, and cesium nitrate). Among these, alkali metal carboxylates, alkali metal carbonates, and alkali metal bicarbonates which can act as a weakly acidic, strongly basic salt when dissociated are preferred to impart basicity to the emulsion, and alkali metal carboxylates are more preferred. Examples of the strongly basic alkali metal compounds include alkali metal hydroxides (such as sodium hydroxide and potassium hydroxide) and alkali metal alkoxides (such as sodium methoxide, sodium ethoxide, sodium propoxide, potassium methoxide, potassium ethoxide, and potassium propoxide).

The use of such an alkali metal compound (F) provides a buffering effect against the pH change of the polymerization system for producing the aqueous emulsion according to the present invention, thereby allowing the emulsion polymerization to proceed stably.

For the emulsion polymerization, a surfactant, a polymerization initiator, a reducing agent, a buffering agent, a polymerization degree regulator etc. can also be used if desired, as long as the effect of the present invention is not impaired.

The surfactant used may be a non-ionic surfactant, an anionic surfactant, or a cationic surfactant. Examples of the non-ionic surfactant include, but are not limited to, polyoxyethylene alkyl ethers, polyoxyethylene alkyl phenyl ethers, polyoxyethylene fatty acid esters, polyoxyalkylene alkyl ethers, polyoxyethylene derivatives, sorbitan fatty add esters, polyoxyethylene sorbitan fatty acid esters, polyoxyethylene sorbitol fatty acid esters, and glycerin fatty acid esters. Examples of the anionic surfactant include, but are not limited to, alkyl sulfates, alkylaryl sulfates, alkyl sulfonates, sulfates of hydroxy alkanols, sulfosuccinic acid esters, and sulfates and phosphates of alkyl or alkylaryl polyethoxy alkanols. Examples of the cationic surfactant include, but are, not limited to, alkylamine salts, quaternary ammonium salts, and polyoxyethylene alkylamines. The amount of the surfactant used is preferably 2 mass % or less with respect to the total amount of the ethylenically unsaturated monomer (e.g., vinyl acetate). It is not preferable that the amount of the surfactant used be more than 2 mass %, because in this case the resulting water resistance, hot water resistance, and boiling water resistance may be low.

A radical-generating catalyst commonly used for emulsion polymerization can be employed as the polymerization initiator. Specific examples of the polymerization initiator include hydrogen peroxide, potassium persulfate, ammonium persulfate, tert-butyl hydroperoxide, azobis-(2-amidinopropane)hydrochloride, lauroyl peroxide, 2,2'-azobisisobutyronitrile, and ketone hydroperoxide. These polymerization initiators may be used by themselves, or a redox catalyst composed of an appropriate combination of any of these polymerization initiators with a reducing agent may be used.

Examples of the reducing agent include amines, ferrous salts (such as ferrous sulfate, ferrous ammonium sulfate, and ferrous pyrophosphate), sodium thiosulfate, sodium sulfite, sodium hyposulfite, formaldehyde sodium sulfoxylate, tartaric acid, tartaric, acid salts, ascorbic acid, ascorbic acid salts, erythorbic acid, and erythorbic acid salts. The amount of the catalyst used and the reducing agent optionally added is typically 0.001 to 10 mass % with respect to the total amount of the ethylenically unsaturated monomer (e.g., vinyl acetate). All of the catalyst and reducing agent may be added at the beginning of the polymerization. Alternatively, a part of the catalyst and reducing agent may be initially added, and the rest may be added as appropriate in accordance with the progress of the polymerization.

Examples of the buffering agent include: acids such as acetic acid, hydrochloric acid, and sulfuric acid: bases such as ammonia, amine, caustic soda, caustic potash, and calcium hydroxide; and alkali carbonates, phosphates, and acetates. Examples of the polymerization degree regulator include mercaptans and, alcohols.

The concentration of solids in the aqueous emulsion (D) may be adjusted as appropriate depending on the intended use and is preferably 30 to 60 mass %, The aqueous emulsion (D) obtained by a method as described above includes the polymer (X) having the ethylenically unsaturated monomer (B), the PVA resin (A), and water. At least one selected from the PVA resin (A) and the polymer (X) has, in a main chain thereof, a structural unit derived from the monomer (C) represented by the above formula (I), (II), (III), or (IV). The content of the structural unit derived from the monomer (C) in the PVA resin (A) or polymer (X) is preferably 0.005 to 10 mol % and more preferably 0.01 to 5 mol % with respect to the total amount of the vinyl ester unit of the PVA resin (A), the vinyl alcohol unit of the PVA resin (A), and the structural unit derived from the monomer (C) or with respect to the total amount of the structural unit derived from the monomer (B).

Saying that a material "has in a main chain thereof, a structural unit, derived from a monomer (C) represented by the formula (I), (II), (III), or (IV)" means that the material has a structural unit represented by the following formula (V), (VI), (VII) or (VIII) in the main chain. The symbols in the formulae (V) to (VIII) are as described for the formulae (I) to (IV). The same symbols (such as $R^1$) used in two or more different formulae among the formulae (V) to (VIII) (for example, the formula (V) and formula (VIII)) may represent the same or different things in the different formulae without departing from the scope of the definitions of the symbols.

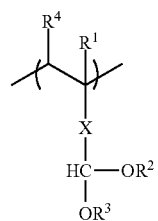

(V)

wherein $R^1$, $R^2$, $R^3$, $R^4$, and X are as defined above,

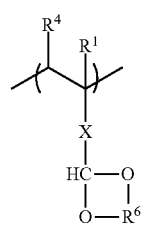

(VI)

wherein $R^1$, $R^4$, $R^6$, and X are as defined above,

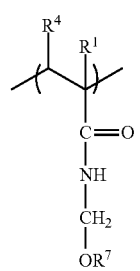

(VII)

wherein $R^1$, $R^4$, and $R^7$ are as defined above,

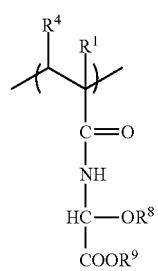

(VIII)

wherein $R^1$, $R^4$, $R^8$, and $R^9$ are a defined above.

The aqueous emulsion composition according to the present invention can be obtained by a production method including the step [2] of mixing the aqueous emulsion (D) including the polymer (X), the PVA resin (A), and water with a cyclic acid anhydride (E) after producing the aqueous emulsion (D) by the step [1] of copolymerizing the ethylenically unsaturated monomer (B) and the monomer (C) in the presence of the PVA resin (A). Another production method by which the aqueous emulsion composition according to the present invention can be obtained is a production method including the steps, of: [1'] emulsion-polymerizing the ethylenically unsaturated monomer (B) in the presence of the polyvinyl alcohol resin (A) having, in a main chain thereof, a structural unit derived from the monomer (C) to obtain the aqueous emulsion (D) including the polymer (X), the vinyl alcohol resin (A), and water; and [2'] mixing the aqueous emulsion (D) and a cyclic acid anhydride (E). The method for mixing in the step [2] or [2'] is not particularly limited, and an exemplary method is to add the cyclic acid anhydride (E) to the aqueous emulsion (D) at room temperature.

Although the mechanism of action of the cyclic acid anhydride (E) in the present invention has not yet been clarified, it is inferred that the cyclic acid anhydride (E) serves as a crosslinking unit by itself and also acts as an acid catalyst after ring-opening. This makes it possible to achieve high levels of heat resistance, water resistance, hot water resistance, boiling water resistance, and viscosity stability of the composition under mild conditions and also to impart stain resistance to a coating obtained using the composition.

Basically, the cyclic acid anhydride (E) used in the present invention, is not limited to specific ones. Examples of usable cyclic acid anhydrides include the following conventionally-known anhydrides: monocyclic acid anhydrides such as succinic anhydride, glutaric anhydride, adipic anhydride, pimelic anhydride, suberic anhydride, azelaic anhydride, sebacic anhydride, maleic anhydride, and itaconic anhydride; heterocyclic acid anhydrides such as phthalic anhydride, trimellitic anhydride, pyromellitic anhydride, methyl endo-methylene tetrahydrophthalic anhydride, endo-tetramethylene tetrahydrophthalic anhydride, hexahydrophthalic anhydride, methylhexahydrophthalic anhydride, hydrophthalic anhydride, methyltetrahydrophthalic anhydride, cis-4-cyclohexene-1,2-dicarboxylic anhydride, and methylbutenyl tetrahydrophthalic anhydride; polymeric cyclic anhydrides such as ethylene/phthalic anhydride copolymer, ethylene/maleic anhydride copolymer, isobutylene/maleic anhydride copolymer, styrene/maleic anhydride copolymer, methyl vinyl ether/phthalic anhydride copolymer, and methyl vinyl ether/maleic anhydride copolymer; and partial hydrolysates and partial esters thereof. These cyclic acid anhydrides (E) may be modified as long as the effect of the present invention is not impaired. For example, an ammonia-modified or imide-modified cyclic acid anhydride may be used. Specific examples include ammonia-modified isobutylene/maleic anhydride copolymer and imidized isobutylene/maleic anhydride copolymer. One of the above cyclic acid anhydrides (E) may be used alone, or two or more thereof may be used in combination.

The amount of the cyclic acid anhydride (E) used is not particularly limited, and is preferably 0.05 to 50 parts by mass, more preferably 0.1 to 40 parts by mass, and even more preferably 0.1 to 20 parts by mass with respect to 100 parts by mass of the aqueous emulsion (D).

The aqueous emulsion composition according to the present invention can be used in adhesive applications for woodworking and paper processing and also in paints and fiber processing. In particular, the aqueous emulsion composition is suitable for use in adhesive applications. An anti-foaming agent, pH adjuster, solvent, pigment, dye, preservative agent, thickener, crosslinking agent, plasticizer etc. may be added if necessary.

A hydrazine compound may be incorporated in the aqueous emulsion composition according to the present invention to improve the water resistance. Examples of the hydrazine compound include, but are not limited to: hydrazine; hydrazine hydrate; hydrazine salts of inorganic acids (such as hydrochloric acid, sulfuric acid, nitric acid, sulfurous acid, phosphoric acid, thiocyanic acid, and carbonic acid); hydrazine salts of organic acids (such as formic acid and oxalic acid); monosubstituted hydrazines such as methylhydrazine, ethylhydrazine, propylhydrazine, butylhydrazine, and allylhydrazine; and symmetrically disubstituted hydrazines such as 1,1-dimethylhydrazine, 1,1-diethylhydrazine, and 4-n-butyl-methylhydrazine. Examples of usable dihydrazines include conventionally known dihydrazines such as oxalic acid dihydrazide, malonic acid dihydrazide, succinic acid dihydrazide, adipic acid dihydrazide, azelaic acid dihydrazide, sebacic acid dihydrazide, dodecanedioic acid dihydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide, and dimer acid dihydrazide. One of these hydrazine compounds may be used alone, or two or more thereof may be used in combination. Among the above hydrazine compounds, adipic acid dihydrazide is particularly preferred. A polyfunctional isocyanate compound and an amine compound may also be incorporated in the aqueous emulsion according to the present invention.

The present invention encompasses embodiments obtainable by combining the above features in various manners within the technical scope of the present invention as long as the effect of the present invention can be obtained.

EXAMPLES

Next, the present invention will be described more specifically with Examples. The present invention is by no means limited by Examples presented below and can be modified in various ways by those ordinarily skilled in the art within the technical scope of the invention. It should be noted that in Examples and Comparative Examples, "%" and "part(s)" refer to "mass %" and "part(s) by mass", respectively, unless otherwise specified.

Aqueous emulsions and aqueous emulsion compositions obtained in Examples and Comparative Examples were evaluated for emulsion polymerization stability, bonding property (normal state, water resistance, hot water resistance, and boiling water resistance), heat resistance, stain resistance under heat treatment, and viscosity stability by the methods described below.

(1) Evaluation of Emulsion Polymerization Stability

An amount of 500 g of each of the aqueous emulsions obtained in Examples and Comparative Examples was filtered through a (60-mesh metal sieve, and the filtration residue was weighed. Evaluation was made as follows, Good: The amount of the filtration residue is 1.0% or less, Average: The amount of the filtration residue is more than 1.0%.

Poor: Filtration fails due to the particles being coarse because of unstable polymerization, (2) Evaluation of Bonding Property (Evaluation in Normal State and Evaluation of Water Resistance, Hot Water Resistance, and Boiling Water Resistance)

[Bonding Conditions]

Adherends Tsuga/Tsuga (straight grain)

Spread: 150 g/M$^2$ (double spread)

Pressing conditions: At 20° C. for 24 hours with a pressure of 10 kg/cm$^2$

[Measurement Conditions]

The compression shear bond strength was measured according to JIS K 6852 (1994).

Normal state: The specimen was aged at 20° C. for 7 days, and the as-aged specimen was subjected to the measurement.

Water resistance: The specimen was immersed in water at 30° C. for 3 hours, and the wet specimen was subjected to the measurement.

Hot water resistance: The specimen was immersed in water at 60° C. for 3 hours, and the wet specimen was subjected to the measurement.

Boiling water resistance: The specimen was aged at 20° C. for 7 days, then immersed in boiling water for 4 hours, then dried in air at 60° C. for 20 hours, and further immersed in boiling water for 4 hours, after which the specimen was cooled by immersion in water at room temperature and the wet specimen was subjected to the measurement.

(3) Evaluation of Heat Resistance

Specimens as used for the evaluation of water resistance were prepared, treated under the following conditions, and then measured for their compression shear bond strength.

[Measurement Conditions]

Heat resistance: The specimen was aged at 20° C. for 7 days and then heated by a thermostatic chamber at 80° C. for 1 hour, after which the hot specimen was subjected to the measurement.

(4) Evaluation of Stain Resistance of Coating

Each of the aqueous emulsion compositions obtained in Examples and Comparative Examples was cast onto a PET film at 20° C. and 65% RH and dried for 7 days, after which the resulting dry product was separated from the PET film to obtain a 500-μm-thick dry coating. This coating was secured to a stainless steel mold (a 20 cm×20 cm metal frame with a thickness of 1 cm) by means of a clip and heated by a gear oven at 120° C. for 3 hours, after which the stain resistance of the coating was visually evaluated as follows.

Good: Not stained,
Average: Slightly stained.
Poor: Yellowed.

(5) Evaluation of Viscosity Stability

The viscosity (η0) of each of the aqueous emulsion compositions obtained in Examples and Comparative Examples was measured with a B-type viscometer (40° C., 20 rpm). The aqueous emulsion was then allowed to stand at 40° C. for 1 month. After that, the viscosity (η30) was measured again with a B-type viscometer (40° C., 20 rpm). Evaluation was made as follows on the basis of a viscosity increase factor which is defined as η30/η0.

Excellent: The viscosity increase factor is less than 1.5.
Good: The viscosity increase factor is 1.5 or more and 2.0 or less.
Average: The viscosity increase factor is more than 2.0 and less than 3.0.
Poor: The viscosity increase factor is 3.0 or more.

Example 1

(Synthesis of Em-1)

An amount of 300 g of ion-exchanged water and 20.7 g of "PVA-117" (manufactured by KURARAY CO., LTD, and having a degree of saponification of 98.5 mol % and an average degree of polymerization of 1700) were introduced into a 1-liter glass polymerization vessel equipped with a reflux condenser, a dropping funnel, a thermometer, and a nitrogen inlet, and were stirred at 95° C. for 2 hours to completely dissolve the PVA. To the resulting solution was added 0.2 g of sodium acetate (NaOAc), which was mixed and dissolved in the solution. Next, the aqueous PVA solution was cooled, purged, with nitrogen, and then heated to 60° C. under stirring at 200 rpm. This was followed by shot addition of 4.4 g of a 10% aqueous solution of tartaric acid and 3 g of a 5% aqueous solution of hydrogen peroxide (their respective molar ratios to the total amount of the initially-introduced monomer were 0.0:15) and then by introduction of 28 g of vinyl acetate and 0.55 g of acrolein dimethyl acetal to initiate polymerization. Completion of the initial polymerization was confirmed (the remaining amount of vinyl acetate was less than 1%) 30 minutes after the start of the polymerization. Shot addition of 0.9 g of a 10% aqueous solution of tartaric acid and 3 g of a 5% aqueous solution of hydrogen peroxide was performed, and then 244 g of vinyl acetate and 4.98 g of acrolein dimethyl acetal were added continuously over 2 hours. The polymerization temperature was maintained at 80° C., and the polymerization was completed to give a polyvinyl acetate emulsion having a solids concentration of 48.41% (the amount of acrolein dimethyl acetal was 2 mass % with respect to the total amount of vinyl acetate). To 100 parts by mass (solids) of this emulsion was added 5 parts by mass of phenoxyethanol as a plasticizer, and the emulsion and phenoxyethanol were mixed. The emulsion (Em-1) thus obtained was evaluated for polymerization stability, and the amount of the filtration residue was determined to be 1.0% or less. The materials of Em-1 and the result of polymerization stability evaluation of Em-1 are shown in Table 1.

(Evaluation of Em-1-Containing Composition)

An aqueous emulsion composition was prepared by adding 1 part by mass of maleic anhydride as the cyclic acid anhydride (E) to 100 parts by mass of the aqueous emulsion Em-1, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 2

An aqueous emulsion (Em-2) was obtained in the same manner as in Example 1, except for using 5 mass % of acrolein diethyl acetal instead of acrolein dimethyl acetal. The materials of Em-2 and the result of polymerization stability evaluation of Em-2 are shown in Table 1. An aqueous emulsion composition was prepared by adding 5 parts by mass of maleic anhydride as the cyclic acid anhydride (E) to 100 parts by mass of the aqueous emulsion EM-2, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 3

An aqueous emulsion (Em-3) was obtained in the same manner as in Example 1, except for using 8 mass % of N-2,2-dimethoxyethyl methacrylamide instead of acrolein dimethyl acetal. The materials of Em-3 and the result of polymerization stability evaluation of Em-3 are shown in Table 1. An aqueous emulsion composition was prepared by adding 10 parts by mass of maleic anhydride as the cyclic acid anhydride (E) to 100 parts by mass of the aqueous emulsion. EM-3, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 4

An aqueous emulsion (Em-4) was obtained in the same manner as in Example 1, except for using 1 mass % of 2-(2-methyl-2-propenyl)-1,3-dioxolane instead of acrolein dimethyl acetal. The materials of Em-4 and the result of polymerization, stability evaluation of Em-4 are shown in Table 1. An aqueous emulsion composition was prepared by adding 0.1 parts by mass of maleic anhydride as the cyclic acid, anhydride (E) to 100 parts by mass of the aqueous emulsion Em-4, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 5

An aqueous emulsion (Em-5) was obtained in the same manner as in Example 1, except for using 0.05 mass % of 2-(6-keptenyl)-1,3-dioxolane instead of acrolein dimethyl acetal. The materials of Em-5 and the result of polymerization stability evaluation of Em-5 are shown in Table 1. An aqueous emulsion composition was prepared by adding 0.1 parts by mass of maleic anhydride as the cyclic acid anhydride (E) to 100 parts by mass of the aqueous emulsion Em-5, and this composition was used to, conduct the evaluation of bonding property under various conditions, the evaluation of heat resistance, the evaluation of stain resistance of a coating, and the evaluation of viscosity stability by the methods described above. The results obtained are shown in Table 2.

Example 6

An aqueous emulsion composition was prepared by adding 4 parts by mass of a 25% aqueous solution of isobutylene-maleic anhydride copolymer (manufactured by KURARAY CO., LTD, under the trade name "ISOBAM 10") as the cyclic acid anhydride (E) to 100 parts by mass of the aqueous emulsion Em-5. The aqueous solution was one prepared by dissolving the copolymer in aqueous ammonia to give a degree of neutralization of 0.4. The aqueous emulsion composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 7

An aqueous emulsion composition was prepared by adding 20 parts by mass of ammonia-modified isobutylene/maleic anhydride copolymer (manufactured by KURARAY CO., LTD, under the trade name "SOBAM 104" (modified with ammonia)) as the cyclic, acid anhydride (E) to 100 parts by mass of the aqueous emulsion Em-5, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 8

An aqueous emulsion composition was prepared by adding 4 parts by mass of a 25% aqueous solution of imidized isobutylene/maleic anhydride copolymer (manufactured by KURARAY CO., LTD. under the trade name "ISOBAM 304" (imidized ISOBAM)) as the cyclic acid anhydride (E) to 100 parts by mass of the aqueous emulsion Em-5. The aqueous solution was one prepared by dissolving the copolymer in aqueous ammonia to give a degree of neutralization of 0.6. The aqueous emulsion composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 9

An aqueous emulsion composition was prepared by adding 1 part by mass of ethylene/maleic anhydride alternating copolymer (manufactured by Sigma Aldrich Co., LLC) as the cyclic acid anhydride (E) to 100 parts by mass of the aqueous emulsion Em-5, and this composition was used to conduct the evaluation of bonding property under various conditions, the evaluation of heat resistance, the evaluation of stain resistance of a coating, and the evaluation a viscosity stability by the methods described above. The results obtained are shown in Table 2,

Example 10

An aqueous emulsion composition was prepared by adding 3 parts by mass of partially-esterified styrene/maleic acid copolymer (manufactured by ARAKAWA CHEMICAL INDUSTRIES, LTD. under the trade name "ARASTAR 703S") as the cyclic acid anhydride (E) to 100 parts by mass of the aqueous emulsion Em-5, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 11

An aqueous emulsion composition was prepared by adding 1 part by mass of methyl vinyl ether/maleic anhydride copolymer (manufactured by ISP Japan Ltd.

under the trade name "AN-119") as the cyclic acid anhydride (E) to 100 parts by mass of the aqueous emulsion Em-5, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 12

(Synthesis of Em-6)
An amount of 300 g of ion-exchanged water and 22.7 g of ethylene-modified PVA 1 (having a degree of polymerization of 1700, a degree of saponification of 95 mol %, and a degree of ethylene modification of 5 mol %) prepared according to a method described in examples of JP 4772175 B were introduced into a 1-liter glass polymerization vessel equipped with a reflux condenser, a dropping funnel, a thermometer, and a nitrogen inlet, and were stirred at 95° C. for 2 hours to completely dissolve the PVA. To the resulting solution was added 0.2 g of sodium acetate (NaOAc), which was mixed and dissolved in the solution. Next, the aqueous PVA solution was cooled, purged with nitrogen, and then heated to 60° C. under stirring at 200 rpm. This was followed by shot addition of 4.4 g of a 10% aqueous solution of tartaric acid and 3 g of a 5% aqueous solution of hydrogen peroxide (their respective molar ratios to the total amount of the initially-introduced monomer were 0.015) and then by introduction of 30 g of vinyl acetate and 0.02 g of 2-(6-beptenyl)-1,3-dioxolane to initiate polymerization. Completion of the initial polymerization was confirmed (the remaining amount of vinyl acetate was less than 1%) 30 minutes after the start of the polymerization. Shot addition of 0.9 g of a 10% aqueous solution of tartaric acid and 3 g of a 5% aqueous solution of hydrogen peroxide was performed, and then 272 g of vinyl acetate and 0.14 g of 2-(6-heptenyl)-1, 3-dioxolane were added continuously over 2 hours. The polymerization temperature was maintained at 80° C., and the polymerization was completed to give a polyvinyl acetate emulsion having a solids concentration of 49.1% (the amount of 2-(6-heptenyl)-1,3-dioxolane was 0.05 mass % with respect to the total amount of vinyl acetate). To 100 parts by mass (solids) of this emulsion was added 5 parts by mass of phenoxyethanol as a plasticizer, and the emulsion and phenoxyethanol were mixed. The emulsion (Em-6) thus obtained was evaluated for polymerization stability, and the amount of the filtration residue was determined to be 1.0% or less. The materials of Em-6 and the result of polymerization stability evaluation of Em-6 are shown in Table 1.

(Evaluation of Em-6-Containing Composition)

An aqueous emulsion composition was prepared by adding 0.1 parts by mass of phthalic anhydride as the cyclic acid anhydride (E) to 100 parts by mass of the aqueous emulsion Em-6, and this composition was used to conduct the evaluation of bonding property under various conditions, the evaluation of heat resistance, the evaluation of stain resistance of a coating, and the evaluation of viscosity stability by the methods described above. The results obtained are shown in Table 2, Example 13

(Synthesis of Em-7)

An amount of 300 g of ion-exchanged water and 20.7 g of ethylene-modified PVA 2 (having a degree of polymerization of 1700, a degree of saponification of 90 mol %, and a degree of ethylene modification of 2 mol %) prepared according to a method described in examples of JP 4772175 B were introduced into a 1-liter glass polymerization vessel equipped with a reflux condenser, a dropping funnel, a thermometer, and a nitrogen inlet, and were stirred at 95° C. for 2 hours to completely dissolve the PVA. To the resulting, solution was added 0.2 g of sodium acetate (NaOAc), which was mixed and dissolved in the solution. Next, the aqueous PVA solution was cooled, purged with nitrogen, and then heated to 60° C. under stirring at 200 rpm. This was followed by shot addition of 4.4 g of a 10% aqueous solution of tartaric acid and 3 g of a 5% aqueous solution of hydrogen peroxide (their respective molar ratios to the total amount of the initially-introduced monomer were 0.015) and then by introduction of 28 g of vinyl acetate and 0.03 g of 2-(6-heptenyl)-1,3-dioxolane to initiate polymerization. Completion of the initial polymerization was confirmed (the remaining amount of vinyl acetate was less than 1%) 30 minutes after the start of the polymerization. Shot addition of 0.9 g of a 10% aqueous solution of tartaric acid and 3 g of a 5% aqueous solution of hydrogen peroxide was performed, and then 249 g of vinyl acetate and 0.25 g of 2-(6-heptenyl)-1, 3-dioxolane were added continuously over 2 hours. The polymerization temperature was maintained at 80° C., and the polymerization was completed to give a polyvinyl acetate emulsion having a solids concentration of 47.2% (the amount of 2-(6-heptenyl)-1,3-dioxolane was 0.1 mass % with respect to the total amount of vinyl acetate). To 100 parts by mass (solids) of this emulsion was added 5 parts by mass of phenoxyethanol as a plasticizer, and the emulsion and phenoxyethanol were mixed. The emulsion. (Em-7) thus obtained was evaluated for polymerization stability, and the amount of the filtration residue was determined to be 1.0% or less. The materials of Em-7 and the result of polymerization stability evaluation of Em-7 are shown in Table 1.

(Evaluation of Em-7-Containing Composition)

An aqueous emulsion composition was prepared by adding 0.1 parts by mass of phthalic anhydride as the cyclic acid anhydride (E) to 100 parts by mass of the aqueous emulsion Em-7, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 14

An aqueous emulsion (Em-8) was obtained in the same manner as in Example 1, except for using 11 mass % of allylidene diacetate instead of acrolein dimethyl acetal. The materials of Em-8 and the result of polymerization stability evaluation of Em-8 are shown in Table 1. An aqueous emulsion composition was prepared by adding 1 part by mass of succinic anhydride to 100 parts by mass of the aqueous emulsion Em-8, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 15

(Synthesis of Em-9)

An amount of 360 g of ion-exchanged water, 24.3 g of polyvinyl alcohol "PVA-205" (manufactured by KURARAY CO., LTD. and having a degree of saponification of 88 mol % and an average degree of polymerization of 500), and 2.9 g of "PVA-217" (manufactured by KURARAY CO., LTD. and having a degree of saponification of 88 mol % and an average degree of polymerization of 1700) were introduced into a stainless steel autoclave having a volume of 1.5 liters and equipped with an anchor stirrer and were stirred at 95° C. for 2 hours to completely dissolve the PVAs. To the resulting solution was added 0.04 g of sodium acetate (NaOAc). Next, 350 g vinyl acetate and 7.29 g of acrolein dimethyl acetal were introduced, and the internal atmosphere, of the autoclave was thoroughly purged with ethylene. Subsequently 19.5 g of a 10% aqueous ascorbic acid solution was introduced. Under stirring, the polymerization temperature was adjusted to 60° C., and the ethylene pressure was increased to 5.0 MPa. An amount of 100 g of a 1% aqueous solution of hydrogen peroxide was added uniformly over 8 hours, and 117 g of vinyl acetate and 2.44 g of acrolein dimethyl acetal were added uniformly over 6 hours. The ethylene pressure was maintained at 5.0 MPa until the completion of addition of vinyl acetate and acrolein dimethyl acetal. The completion of catalyst addition was followed by cooling and then by addition of an anti-foaming agent and a pH adjuster, giving an aqueous emulsion. The emulsion (Em-9) thus obtained was evaluated for polymerization stability, and the amount of the filtration residue was determined to be 1.0% or less. The materials of Em-9 and the result of polymerization stability evaluation of Em-9 are shown in Table 1.

(Evaluation of Em-9-Containing Composition)

An aqueous emulsion composition was prepared by adding 1 part by mass of glutaric anhydride as the cyclic acid anhydride (E) to 100 parts by mass of the aqueous emulsion Em-9, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 16

(Synthesis of Em-11)

An amount of 300 g of ion-exchanged water and 19.5 g of ethylene-modified PVA 1 (having a degree of polymerization of 1700, a degree of saponification of 95 mol %, and a degree of ethylene modification of 5 mol %) were introduced into a 1-liter glass polymerization vessel equipped with a reflux condenser, a dropping funnel, a thermometer, and a nitrogen inlet, and were stirred at 95° C. for 2 hours to completely dissolve the PVA. To the resulting solution was added 0.2 g of sodium acetate (NaOAc), which was mixed and dissolved in the solution. Next, the aqueous PVA solution was cooled, purged with nitrogen, and then heated to 60° C. under stirring at 200 rpm. This was followed by shot addition of 4.4 g of a 10% aqueous solution of tartaric acid and 3 g of a 5% aqueous solution of hydrogen peroxide (their respective molar ratios to the total amount of the initially-introduced monomer were 0.015) and then by introduction of 26 g of vinyl acetate to initiate polymerization. Completion of the initial polymerization was confirmed (the remaining amount of vinyl acetate was less than 1%) 30 minutes after the start of the polymerization. Shot addition of 0.9 g of a 10% aqueous solution of tartaric acid and 3 g of a 5% aqueous solution of hydrogen peroxide was performed, and then 234 g of vinyl acetate and 7.8 g of N methylol acrylamide were added continuously over 2 hours. The polymerization temperature was maintained at 80° C., and the polymerization was completed to give a polyvinyl acetate emulsion having a solids concentration of 47.2% (containing N-methylol acrylamide in an amount of 3 mass % with respect to the total amount (100 mass %) of vinyl acetate). To 100 parts by mass (solids) of this emulsion was added 5 parts by mass of phenoxyethanol as plasticizer, and the emulsion and phenoxyethanol were mixed. The emulsion (Em-11) thus obtained was evaluated for polymerization stability, and the amount of the filtration residue was determined to be 1.0% or less. The materials of Em-11 and the result of polymerization stability evaluation of Em-11 are shown in Table 1.

(Evaluation of Em-11-Containing Composition)

An aqueous emulsion composition was prepared by adding 0.5 parts by mass of phthalic anhydride as the cyclic acid anhydride (E) to 100 parts by mass of the aqueous emulsion Em-11, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 17

An aqueous emulsion-(Em-12) was obtained in the same manner as in Example 16, except for using 3 mass % of butoxymethyl acrylamide instead of N-methylol acrylamide. The materials of Em-12 and the result, of polymerization stability evaluation of Em-12 are shown in Table 1. An aqueous emulsion composition was prepared by adding 0.5 parts by mass of phthalic anhydride as the cyclic acid anhydride (E) to 100 parts by mass of the aqueous emulsion Em-12, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 18

An aqueous emulsion (Em-13) was obtained in the same manner as in Example 16, except for using 3 mass % of methyl acrylamidoglycolate instead of N-methylol acrylamide. The materials of Em-13 and the result of polymerization stability evaluation of Em-13 are shown in Table 1. An aqueous emulsion composition was prepared by adding 0.5 parts by mass of phthalic anhydride as the cyclic acid anhydride (E) to 100 parts by, mass of the aqueous emulsion Em-13, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 19

(Synthesis of 2-(6-heptenyl)-1,3-dioxolane-modified PVA)

An amount of 2100 g of vinyl acetate, 286 g of methanol, and 54 g of 2-(6-heptenyl)-1,3-dioxolane as a comonomer were introduced into a reaction vessel equipped with a stirrer, a nitrogen inlet, an additive inlet, and an initiator inlet, and the reaction system was heated to 60° C. and then purged with nitrogen by nitrogen bubbling for 30 minutes. The temperature inside the reaction vessel was adjusted to 60° C., and 1.9 g of 2,2'-azobis(2,4-dimethylvaleronitrile) was added to initiate polymerization. The polymerization temperature was maintained at 60° C. during the polymerization. The rate of polymerization reached 50% after 4 hours, at which time the polymerization was terminated by cooling. Next, vinyl acetate remaining unreacted was removed under reduced pressure, and thus a methanol solution of polyvinyl acetate (PVAc) was obtained. The PVAc thus obtained was purified by five cycles of reprecipitation using acetone as a good solvent and hexane as a poor solvent, and the purified. PVAc was vacuum-dried. The PVAc thus obtained was then dissolved in deuterochloroform, and the resulting solution was subjected to $^1$H-NMR spectrometry. The degree of modification was determined to be 0.6 mol %. The above methanol solution of PVAc was adjusted to a concentration of 30% and was saponified by adding a methanol solution of NaOH (concentration=10%) so that an alkali molar ratio (the number of moles of NaOH/the number of moles of vinyl ester unit in PVAc) was 0.01. The resulting vinyl alcohol copolymer was washed with methanol. The above procedures yielded a vinyl alcohol copolymer having a degree of polymerization of 1500 and a degree of saponification of 92 mol %.

(Synthesis of Em-14)

Em-14 was obtained in the same, manner as in Example 1, except for using the 2-(6-heptenyl)-1,3-dioxolane-modified PVA instead at PVA-117 and not using acrolein dimethyl acetal as the copolymerization monomer (C). The materials of Em-14 and the result of polymerization stability evaluation at Em-14 are shown in Table 1.

(Evaluation of Em-14-Containing Composition)

An aqueous emulsion composition was prepared by adding 1 part by mass of phthalic anhydride as the cyclic acid anhydride (E) to 100 parts $b_3$' mass of the aqueous emulsion Em-14, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 20

(Synthesis of N-Methylol Acrylamide-Modified PVA)

An amount of 2100 g of vinyl acetate, 525 g of methanol, and 27 g of N-methylol acrylamide as a co monomer were introduced into a reaction vessel equipped with a stirrer, a nitrogen inlet, an additive inlet, and an initiator inlet, and the reaction system was heated to 60° C. and then purged with nitrogen by nitrogen bubbling for 30 minutes. The temperature inside the reaction vessel was adjusted to 60° C. and 1.1 g of 2,2'-azobis(isobutyronitrile) was added to initiate polymerization. The polymerization temperature was maintained at 60° C. during the polymerization. A 10% methanol solution of N-methylol acrylamide was added successively during the polymerization to maintain constant the ratio between vinyl acetate and N-methylol acrylamide in the polymerization reaction solution. The rate of polymerization reached 50% after 4 hours, at which time the polymerization was terminated by cooling. The total volume of the comonomer solution added until the termination was 140 ml. Next, vinyl acetate remaining unreacted was removed under reduced pressure, and thus a methanol solution of polyvinyl acetate (PVAc) was obtained. The PVAc thus obtained was purified by five cycles of reprecipitation using acetone as a good solvent and hexane as a poor solvent, and the purified PVAc was vacuum-dried. The PVAc thus obtained was then dissolved in deuterochloroform, and the resulting solution was subjected to $^1$H-NMR spectrometry. The degree of modification was determined to be 1 mol %. The above methanol solution of PVAc was adjusted to a concentration of 30% and was saponified by adding a methanol solution of NaOH (concentration=10%) so that an alkali molar ratio (the number of moles of NaOH/the number of moles of vinyl ester unit in PVAc) was 0.008. The resulting, vinyl alcohol copolymer was washed with methanol. The above procedures yielded a vinyl alcohol copolymer having a degree of polymerization of 1700 and a degree of saponification of 88 mol %.

(Synthesis of Em-15)

Em-15 was obtained in the same manner as in Example 1, except for using the N-methylol acrylamide-modified PVA instead of PVA-117 and not using acrolein dimethyl acetal as the copolymerization monomer (C). The materials of Em-15 and the result of polymerization stability evaluation of Em-15 are shown in Table 1.

(Evaluation of Em-15-Containing Composition)

An aqueous emulsion composition was prepared by adding 1 part by mass of phthalic anhydride as the cyclic acid anhydride (E) to 100 parts by mass of the aqueous emulsion Em-15, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Example 21

(Synthesis of Acrolein Dimethyl Acetal-Modified PVA)

An amount of 2100 g vinyl acetate, 288 g of methanol, and 28 g of acrolein dimethyl acetal as a comonomer were introduced into a reaction vessel equipped with a stirrer, a nitrogen inlet, an additive inlet, and an initiator inlet, and the reaction system was heated to 60° C. and then purged with nitrogen by nitrogen bubbling for 30 minutes. The temperature in the reaction vessel was adjusted to 60° C., and 0.15 g of 2,2'-azobis(isobutyronitrile) was added to initiate polymerization. The polymerization temperature was maintained at 60° C. during the polymerization. The rate of polymerization reached 30% after 4 hours, at which time the polymerization was terminated by cooling. Next, vinyl acetate remaining unreacted was removed under reduced pressure, and thus a methanol solution of polyvinyl acetate (PVAc) was obtained. The PVAc thus obtained was purified by five cycles of reprecipitation using acetone as a good solvent and hexane as a poor solvent, and the purified PVAc was vacuum-dried. The PVAc thus obtained was then dissolved in deuterochloroform, and the resulting solution was subjected to $^1$H-NMR spectrometry. The degree of modification was determined to be 1 mol %. The above methanol solution of PVAc was adjusted to a concentration of 20% and was saponified by adding a methanol solution of NaOH (concentration=10%) so that an alkali molar ratio (the number of moles of NaOH/the number of moles of vinyl ester unit in PVAc) was 0.03. The resulting vinyl, alcohol copolymer was washed with methanol. The above procedures yielded a vinyl alcohol copolymer having a degree of polymerization of 1500 and a degree of saponification of 98.5 mol %.

(Synthesis of Em-16)

Em-16 was obtained in the same manner as in Example 1, except for using the acrolein dimethyl acetal-modified PVA instead of PVA-117 and using 0.1 mass % of acrolein dimethyl acetal as the copolymerization monomer (C). The materials of Em-16 and the result of polymerization stability evaluation of Em-16 are shown in Table 1.

(Evaluation of Em-16-Containing Composition)

An aqueous emulsion composition was prepared by adding 1 part by mass of phthalic anhydride as the cyclic acid anhydride (E) to 100 parts by mass of the aqueous emulsion Em-16, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Comparative Example 1

An aqueous emulsion-(Em-18) was obtained in the same manner as in Example 12, except for not using 2-(6- heptenyl)-1,3-dioxolane. The materials of Em-18 and the result of polymerization stability evaluation of Em-18 are shown in Table 1. The aqueous emulsion Em-18 was used to conduct the evaluation of bonding property under various conditions, the evaluation of heat resistance, the evaluation of stain resistance of a coating, and the evaluation of viscosity stability by the methods described above. The results obtained are shown in Table 2.

Comparative Example 2

An aqueous emulsion composition was prepared by adding 1 part by mass of phthalic anhydride as the cyclic acid anhydride (E) to 100 parts by mass of the aqueous emulsion Em-18, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Comparative Example 3

(Synthesis of Em-10)

An amount of 300 g of ion-exchanged water and 19.5 g of "PVA-117" (manufactured by KURARAY CO., LTD. and having a degree of, saponification of 98.5 mol % and an average degree of polymerization of 1700) were introduced into a 1 liter glass polymerization vessel equipped with a reflux condenser, a dropping funnel, a thermometer, and a nitrogen inlet, and were stirred at 95° C. for 2 hours to completely dissolve the PVA. To the resulting solution was added 0.2 g of sodium acetate (NaOAc), which was mixed and dissolved in the solution. Next, the aqueous PVA solution was cooled, purged with nitrogen, and then heated to 60° C. under stirring at 200 rpm. This was followed by shot addition of 4.4 g of a 10% aqueous solution of tartaric acid and 3 g of a 5% aqueous solution of hydrogen peroxide (their respective molar ratios to the total amount of the initially-introduced monomer were 0.015) and then by introduction, of 26 g of vinyl acetate to initiate polymerization. Completion of the initial polymerization was confirmed (the remaining amount of vinyl acetate was less than 1%) 30 minutes after the start of the polymerization. Shot addition of 0.9 g of a_10%, aqueous solution of tartaric acid and 3 g of a 5% aqueous solution of hydrogen peroxide was performed, and then 234 g of vinyl acetate and 2.6 g of N-methylol acrylamide were added continuously over 2 hours. The polymerization temperature was maintained at 80° C., and the polymerization was completed to give a polyvinyl acetate emulsion having a solids concentration of 47.2% (containing N-methylol acrylamide in an amount of 1 mass % with respect to the total amount (100 mass %) of vinyl acetate). To 100 parts by mass (solids) of this emulsion was added 5 parts by mass of phenoxyethanol as a plasticizer, and the emulsion and phenoxyethanol were mixed. The emulsion (Em-10) thus obtained was evaluated for polymerization stability, and the amount of the filtration residue was determined to be 1.0% or less. The materials of Em-10 and the result of polymerization stability evaluation of Em-10 are shown in Table 1.

(Evaluation of Em-10)

The aqueous emulsion Em-10 was used to conduct the evaluation of bonding property under various conditions, the evaluation of heat resistance, the evaluation of stain resistance of a coating, and the evaluation of viscosity stability of the aqueous emulsion by the methods described above. The results obtained are shown in Table 2.

Comparative Example 4

An aqueous emulsion composition was prepared by adding 1.5 parts by mass of $AlCl_3$, instead of the cyclic acid anhydride (E), to 100 parts by mass of the aqueous emulsion Em-10, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

Comparative Example 5

An emulsion Em-17 was prepared according to Example 1 of Patent Literature 1 (JP 8(1996)-60116 A). The materials of Em-17 and, the result of polymerization stability evaluation of Em-17 are shown in Table 1. In Table 1, "Mowiol™ 18-88" denotes a partially-hydrolyzed polyvinyl alcohol having a degree of hydrolysis of 88 mol %. In Table 2, "20% GABNA" denotes a 20% solution of glutardialdehyde-bis (sodium hydrogen sulfite) dissolved in water. Em-17 was used to conduct the evaluation of bonding property under various conditions, the evaluation of heat resistance, the evaluation of stain resistance of a coating, and the evaluation of viscosity stability by the methods described above. The results obtained are shown in Table 2.

Comparative Example 6

An emulsion Em-19 was prepared according to Example 1 of Patent Literature 4 (JP 2001-12318 A). The materials of Em-19 and the result of polymerization stability evaluation of Em-19 are shown in Table 1. Em-19 was used to conduct the evaluation of bonding property under various conditions, the evaluation of heat resistance, the evaluation of stain resistance of a coating, and the evaluation of viscosity stability by the methods described above. The results obtained are shown in Table 2.

Comparative Example 7

An emulsion Em-2.0 was prepared according to Reference 5.2 in Example 5 of Patent Literature 5 (JP 2003-517499A). Em-20 was adjusted to a pH of 2 by adding 10% hydrochloric acid, and the pH-adjusted Em-20 was used to conduct the evaluation of bonding property under various conditions, the evaluation of heat resistance, the evaluation of stain resistance of a coating, and the evaluation of viscosity stability by the methods described above. The results obtained are shown in Table 2.

Comparative Example 8

An aqueous emulsion composition was prepared by adding 5 parts by mass of a 30 mass % aqueous aluminum sulfate solution, instead of the cyclic acid anhydride (E) to 100 parts by mass of the aqueous emulsion Em-10, and this composition was used to conduct the evaluation of bonding property under various conditions, the evaluation of heat resistance, the evaluation of stain resistance of a coating, and the evaluation of viscosity stability by the methods described above. The results obtained are shown in Table 2.

TABLE 1

| | PVA resin (A) Type | Copolymerization monomer (B) 1 | Copolymerization monomer (B) 2 | Copolymerization monomer (C) Type | Amount (mass %) | Polymerization stability |
|---|---|---|---|---|---|---|
| Em-1 | PVA-117 | Vinyl acetate | — | Acrolein dimethyl acetal | 2 | Good |
| Em-2 | PVA-117 | Vinyl acetate | — | Acrolein diethyl acetal | 5 | Good |
| Em-3 | PVA-117 | Vinyl acetate | — | N-2,2-dimethoxyethyl methacrylamide | 8 | Good |
| Em-4 | PVA-117 | Vinyl acetate | — | 2-(2-methyl-2-propenyl)-1,3-dioxolane | 1 | Good |
| Em-5 | PVA-117 | Vinyl acetate | — | 2-(6-heptenyl)-1,3-dioxolane | 0.05 | Good |
| Em-6 | Ethylene-modified PVA 1 | Vinyl acetate | — | 2-(6-heptenyl)-1,3-dioxolane | 0.05 | Good |
| Em-7 | Ethylone-modified PVA 2 | Vinyl acetate | — | 2-(6-heptenyl)-1,3-dioxolane | 0.1 | Good |
| Em-8 | PVA-117 | Vinyl acetate | — | Allylidene diacetate | 11 | Average |
| Em-9 | PVA-217, PVA-205 | Vinyl acetate | Ethylene | Acrolein dimethyl acetal | 1 | Good |
| Em-10 | PVA-117 | Vinyl acetate | — | N-methylol acrylamide | 1 | Good |
| Em-11 | Ethylene-modified PVA 1 | Vinyl acetate | — | N-methylol acrylamide | 3 | Good |
| Em-12 | Ethylene-modified PVA 1 | Vinyl acetate | — | Butoxymethyl acrylamide | 3 | Good |
| Em-13 | Ethylene-modified PVA 1 | Vinyl acetate | — | Methyl acrylamidoglycolate | 3 | Good |
| Em-14 | 2-(6-heptenyl)-1,3-dioxolane-modified PVA | Vinyl acetate | — | Not applicable | 0 | Good |
| Em-15 | N-methylol acrylamide-modified PVA | Vinyl acetate | — | Not applicable | 0 | Good |
| Em-16 | Acrolein dimethyl acetal-modified PVA | Vinyl acetate | — | Acrolein dimethyl acetal | 0.1 | Good |
| Em-17 | Mowiol™ 18-88 | Vinyl acetate | — | Not applicable | 0 | Good |
| Em-18 | Ethylene-modified PVA 1 | Vinyl acetate | — | Not applicable | 0 | Good |
| Em-19 | Ethylene-modified PVA Polyacrylic acid | Vinyl acetate | — | Not applicable | 0 | Good |
| Em-20 | Not applicable | Methyl methacrylate | Butyl acrylate | Methacrylamidoacetaldehyde dimethyl acetal | 5.7 | Good |

TABLE 2

| | Em (D) Type | Cyclic acid anhydride (E) Type | Amount (parts by mass/Em) | Normal state (kg/cm²) | Hot water resistance (kg/cm²) | Boiling resistance (kg/cm²) | Heat resistance (kg/cm²) | Coating staining | Viscosity stability |
|---|---|---|---|---|---|---|---|---|---|
| Example 1 | Em-1 | Maleic anhydride | 1 | 115 | 41 | 35 | 45 | Good | Good |
| Example 2 | Em-2 | Maleic anhydride | 5 | 115 | 41 | 35 | 44 | Good | Good |
| Example 3 | Em-3 | Maleic anhydride | 10 | 119 | 34 | 30 | 40 | Good | Good |
| Example 4 | Em-4 | Phthalic anhydride | 0.1 | 117 | 39 | 35 | 43 | Good | Excellent |
| Example 5 | Em-5 | Phthalic anhydride | 0.1 | 120 | 38 | 40 | 43 | Good | Excellent |
| Example 6 | Em-5 | 25% ISOBAM 10 (degree of neutralization: 0.4) | 4 | 105 | 40 | 39 | 48 | Good | Good |
| Example 7 | Em-5 | ISOBAN 104 | 20 | 117 | 43 | 46 | 50 | Good | Good |
| Example 8 | Em-5 | 25% ISOBAM 304 (degree of neutralization: 0.6) | 4 | 120 | 39 | 38 | 49 | Good | Good |
| Example 9 | Em-5 | Ethylene/Maleic anhydride copolymer | 1 | 120 | 42 | 40 | 51 | Good | Good |
| Example 10 | Em-5 | ARASTAR 703S | 3 | 119 | 41 | 40 | 51 | Good | Good |
| Example 11 | Em-5 | AN-119 | 1 | 125 | 41 | 40 | 50 | Good | Good |
| Example 12 | Em-6 | Phthalic anhydride | 0.1 | 119 | 40 | 37 | 48 | Good | Excellent |
| Example 13 | Em-7 | Phthalic anhydride | 0.1 | 121 | 37 | 33 | 49 | Good | Excellent |
| Example 14 | Em-8 | Succinic anhydride | 1 | 118 | 38 | 33 | 49 | Average | Good |
| Example 15 | Em-9 | Glutaric anhydride | 1 | 120 | 38 | 40 | 47 | Good | Good |
| Example 16 | Em-11 | Phthalic anhydride | 0.5 | 120 | 40 | 41 | 55 | Good | Excellent |
| Example 17 | Em-12 | Phthalic anhydride | 0.5 | 114 | 37 | 34 | 51 | Good | Excellent |
| Example 18 | Em-13 | Phthalic anhydride | 0.5 | 117 | 38 | 34 | 48 | Good | Excellent |
| Example 19 | Em-14 | Phthalic anhydride | 1 | 117 | 44 | 32 | 40 | Good | Excellent |
| Example 20 | Em-15 | Phthalic anhydride | 1 | 112 | 48 | 33 | 42 | Good | Excellent |
| Example 21 | Em-16 | Phthalic anhydride | 1 | 123 | 52 | 48 | 59 | Good | Good |
| Comparative Example 1 | Em-18 | Not applicable | 0 | 99 | 24 | Not measurable | 34 | Good | Excellent |
| Comparative Example 2 | Em-18 | Phthalic anhydride | 1 | 104 | 22 | Not measurable | 36 | Good | Excellent |
| Comparative Example 3 | Em-10 | Not applicable | 0 | 114 | 10 | 7 | 36 | Good | Excellent |
| Comparative Example 4 | Em-10 | (AlCl₃) | 1.5 | 115 | 14 | 22 | 47 | Poor | Average |
| Comparative Example 5 | Em-17 | (AlCl₃, 20% GABNA) | 3.4, 2.5 | 122 | 56 | 45 | 64 | Average | Poor |

TABLE 2-continued

| | Em (D) Type | Cyclic acid anhydride (E) Type | Amount (parts by mass/Em) | Normal state (kg/cm$^2$) | Hot water resistance (kg/cm$^2$) | Boiling resistance (kg/cm$^2$) | Heat resistance (kg/cm$^2$) | Coating staining | Viscosity stability |
|---|---|---|---|---|---|---|---|---|---|
| Comparative Example 6 | Em-19 | Not applicable | 0 | 119 | 24 | 27 | 38 | Good | Average |
| Comparative Example 7 | Em-20 | 10% hydrochloric acid | (pH 2) | 117 | 46 | 35 | 30 | Poor | Average |
| Comparative Example 8 | Em-10 | 30% aluminum sulfate | 5 | 110 | 20 | 26 | 50 | Poor | Average |

In this table, "parts by mass/Em" denotes the amount (parts by mass) of the cyclic acid anhydride (E) used with respect to 100 parts by mass of the aqueous emulsion (D).

INDUSTRIAL APPLICABILITY

The aqueous emulsion composition according to the present invention is excellent in heat resistance and also in water resistance, hot water resistance, and boiling water resistance, and can be used in adhesive applications for woodworking and paper processing and also in paints and fiber processing.

The invention claimed is:

1. An aqueous emulsion composition, comprising:
   an aqueous emulsion and
   a cyclic acid anhydride,
   wherein
   the aqueous emulsion comprises:
      a polymer having an ethylenically unsaturated monomer,
      a polyvinyl alcohol resin, and
      water, and
   at least one of the polyvinyl alcohol resin and the polymer has, in a main chain thereof, a structural unit derived from a monomer of formula (I), (II), (III), or (IV):

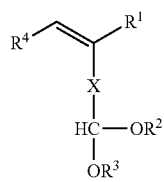

(I)

wherein:
   $R^1$ is a hydrogen atom, a linear alkyl group having 1 to 8 carbon atoms, or —CH$_2$—COOM, where M is a hydrogen atom, a methyl group, an alkali metal, or an ammonium group;
   $R^2$ and $R^3$ are each independently an alkyl group having 1 to 8 carbon atoms or an alkylcarbonyl group having 2 to 8 carbon atoms;
   $R^4$ is a hydrogen atom or —COOM, where M is a hydrogen atom, a methyl group, an alkali metal, or an ammonium group; and X is —(CH$_2$)$_n$—, —CO—NH—(CH$_2$)$_n$—, —NH—CO—(CH$_2$)$_n$—, —CO—(CH$_2$)$_n$—, —CO—O—(CH$_2$)$_n$—, —O—CO—(CH$_2$)$_n$—, —NR$^5$—CO—(CH$_2$)$_n$—, or —CO—NR$^5$—(CH$_2$)$_n$—, where R$^5$ is a hydrogen atom or an alkyl group having 1 to 4 carbon atoms and n is an integer of 0 to 8,

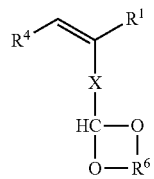

(II)

wherein R$^6$ is —(CH$_2$—CH$_2$)$_m$—, and m is an integer of 1 to 3,

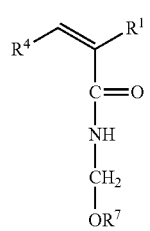

(III)

wherein R$^7$ is a hydrogen atom or a linear alkyl group having 1 to 6 carbon atoms,

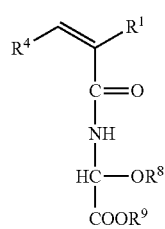

(IV)

wherein R$^8$ and R$^9$ are each independently a hydrogen atom or a linear alkyl group having 1 to 6 carbon atoms, wherein the cyclic acid anhydride is at least one selected from the group consisting of a monocyclic acid anhydride, a heterocyclic acid anhydride, a polymeric cyclic anhydride, a partial hydrolysate thereof, a partial ester thereof, an ammonia-modified cyclic acid anhydride thereof, and imide-modified cyclic acid anhydride thereof, wherein the monocyclic acid anhydride is at least one selected from the group consisting of succinic anhydride, glutaric anhydride, adipic anhydride, pimelic anhydride, suberic anhydride, azelaic anhydride, sebacic anhydride, maleic anhydride, and itaconic anhydride, wherein the heterocyclic acid anhydride is at least one selected from the group consisting of phthalic anhydride, trimellitic anhydride, pyromellitic anhydride, methyl endo-methylene tetrahydrophthalic anhydride, endo-tetramethylene tetrahydroophthalic anhydride, hexahydrophthalic anhydride, methylhexahydrophthalic anhydride, hydrophthalic anhydride, methyltetrahydrophthalic anhydride, cis-4-cyclohexene-1,2-dicarboxylic anhydride, and methylbutenyl tetrahydrophthalic anhydride, and wherein the polymeric cyclic anhydride is at least one selected from the group consisting of ethylene/phthalic anhydride copolymer, ethylene/maleic anhydride copolymer, isobutylene/maleic anhydride copolymer, styrene/maleic anhydride copolymer, methyl vinyl ether/phthalic anhydride copolymer, and methyl vinyl ether/maleic anhydride copolymer.

2. The aqueous emulsion composition according to claim 1, wherein the polymer has, in the main chain thereof, the structural unit derived from the monomer of the formula (I), (II), (III), or (IV).

3. The aqueous emulsion composition according to claim 1, wherein the monomer is a monomer of the formula (II) or (III).

4. The aqueous emulsion composition according to claim 1, wherein X is —(CH$_2$)$_n$— in the formula (II), or R$^7$ is a hydrogen atom in the formula (III).

5. The aqueous emulsion composition according to claim 1, wherein the ethylenically unsaturated monomer is at least one selected from the group consisting of a vinyl ester monomer and a diene monomer.

6. The aqueous emulsion composition according to claim 1, wherein the polyvinyl alcohol resin further comprises an ethylene unit.

7. A method for producing the aqueous emulsion composition according to claim 1, the method comprising:
emulsion-polymerizing an ethylenically unsaturated monomer and a monomer of formula (I), (II), (III), or (IV) in the presence of a polyvinyl alcohol resin to obtain an aqueous emulsion comprising a polymer, the polyvinyl alcohol resin, and water; and
mixing the aqueous emulsion and a cyclic acid anhydride:

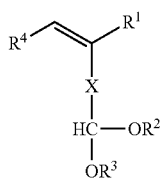
(I)

wherein:
R$^1$ is a hydrogen atom, a linear alkyl group having 1 to 8 carbon atoms, or —CH$_2$—COOM, where M is a hydrogen atom, a methyl group, an alkali metal, or an ammonium group;
R$^2$ and R$^3$ are each independently an alkyl group having 1 to 8 carbon atoms or an alkylcarbonyl group having 2 to 8 carbon atoms;
R$^4$ is a hydrogen atom or —COOM, where M is a hydrogen atom, a methyl group, an alkali metal, or an ammonium group; and X is —(CH$_2$)$_n$—, —CO— NH—(CH$_2$)$_n$—, —NH—CO—(CH$_2$)$_n$—, —CO—(CH$_2$)$_n$—, —CO—O—(CH$_2$)$_n$—, —O—CO—(CH$_2$)$_n$—, —NR$^5$—CO—(CH$_2$)$_n$—, or —CO—NR$^5$—(CH$_2$)$_n$—, where R$^5$ is a hydrogen atom or an alkyl group having 1 to 4 carbon atoms and n is an integer of 0 to 8,

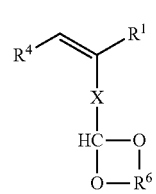
(II)

wherein R$^6$ is —(CH$_2$—CH$_2$)$_m$—, and m is an integer of 1 to 3,

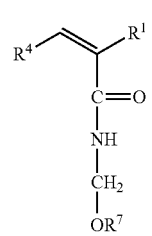
(III)

wherein R$^7$ is a hydrogen atom or a linear alkyl group having 1 to 6 carbon atoms,

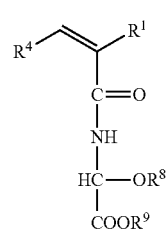
(IV)

wherein R$^8$ and R$^9$ are each independently a hydrogen atom or a linear alkyl group having 1 to 6 carbon atoms,
wherein the cyclic acid anhydride is at least one selected from the group consisting of a monocyclic acid anhydride, a heterocyclic acid anhydride, a polymeric cyclic anhydride, a partial hydrolysate thereof, a partial ester thereof, an ammonia-modified cyclic acid anhydride thereof, and imide-modified cyclic acid anhydride thereof,
wherein the monocyclic acid anhydride is at least one selected from the group consisting of succinic anhydride, glutaric anhydride, adipic anhydride, pimelic anhydride, suberic anhydride, azelaic anhydride, sebacic anhydride, maleic anhydride, and itaconic anhydride,
wherein the heterocyclic acid anhydride is at least one selected from the group consisting of phthalic anhydride, trimellitic anhydride, pyromellitic anhydride, methyl endo-methylene tetrahydrophthalic anhydride, endo-tetramethylene tetrahydroophthalic anhydride, hexahydrophthalic anhydride, methylhexahydrophthalic anhydride, hydrophthalic anhydride, methyltetrahydrophthalic anhydride, cis-4-cyclohexene-1,2-dicarboxylic anhydride, and methylbutenyl tetrahydrophthalic anhydride, and wherein the polymeric cyclic anhydride is at least one selected from the group consisting of ethylene/phthalic anhydride copolymer, ethylene/maleic anhydride copolymer, isobutylene/maleic anhydride copolymer, styrene/maleic anhydride copolymer, methyl vinyl ether/phthalic anhydride copolymer, and methyl vinyl ether/maleic anhydride copolymer.

8. The method according to claim 7, wherein an amount of the monomer used in the emulsion-polymerizing is 0.01 to 10 mass % with respect to a total amount of the ethylenically unsaturated monomer.

9. A method for producing the aqueous emulsion composition according to claim 1, the method comprising:

emulsion-polymerizing an ethylenically unsaturated monomer in the presence of a polyvinyl alcohol resin having, in a main chain thereof, a structural unit derived from a monomer of the formula (I), (II), (III), or (IV) to obtain an aqueous emulsion comprising a polymer, the polyvinyl alcohol resin, and water; and mixing the aqueous emulsion and a cyclic acid anhydride:

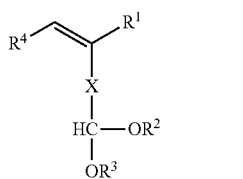
(I)

wherein:
R$^1$ is a hydrogen atom, a linear alkyl group having 1 to 8 carbon atoms, or —CH$_2$—COOM, where M is a hydrogen atom, a methyl group, an alkali metal, or an ammonium group;

R$^2$ and R$^3$ are each independently an alkyl group having 1 to 8 carbon atoms or an alkylcarbonyl group having 2 to 8 carbon atoms;

R$^4$ is a hydrogen atom or —COOM, where M is a hydrogen atom, a methyl group, an alkali metal, or an ammonium group; and X is —(CH$_2$)$_n$—, —CO—NH—(CH$_2$)$_n$—, —NH—CO—(CH$_2$)$_n$—, —CO—(CH$_2$)$_n$—, —CO—O—(CH$_2$)$_n$—, —O—CO—(CH$_2$)$_n$—, —NR$^5$—CO—(CH$_2$)$_n$—, or —CO—NR$^5$—(CH$_2$)$_n$—, where R$^5$ is a hydrogen atom or an alkyl group having 1 to 4 carbon atoms and n is an integer of 0 to 8,

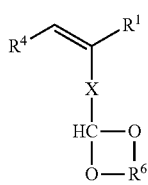
(II)

wherein R$^6$ is —(CH$_2$—CH$_2$)$_m$—, and m is an integer of 1 to 3,

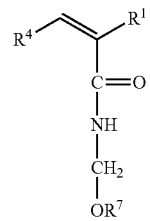
(III)

wherein R$^7$ is a hydrogen atom or a linear allyl group having 1 to 6 carbon atoms,

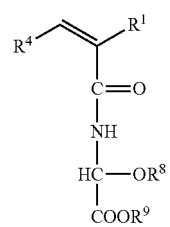
(IV)

wherein R$^8$ and R$^9$ are each independently a hydrogen atom or a linear alkyl group having 1 to 6 carbon atoms, wherein the cyclic acid anhydride is at least one selected from the group consisting of a monocyclic acid anhydride, a heterocyclic acid anhydride, a polymeric cyclic anhydride, a partial hydrolysate thereof, a partial ester thereof, an ammonia-modified cyclic acid anhydride thereof, and imide-modified cyclic acid anhydride thereof, wherein the monocyclic acid anhydride is at least one selected from the group consisting of succinic anhydride, glutaric anhydride, adipic anhydride, pimelic anhydride, suberic anhydride, azelaic anhydride, sebacic anhydride, maleic anhydride, and itaconic anhydride, wherein the heterocyclic acid anhydride is at least one selected from the group consisting of phthalic anhydride, trimellitic anhydride, pyromellitic anhydride, methyl endo-methylene tetrahydrophthalic anhydride, endo-tetramethylene tetrahydrophthalic anhydride, hexahydrophthalic anhydride, methylhexahydrophthalic anhydride, hydrophthalic anhydride, methyltetrahydrophthalic anhydride, cis-4-cyclohexene-1,2-dicarboxylic anhydride, and methylbutenyl tetrahydrophthalic anhydride, and wherein the polymeric cyclic anhydride is at least one selected from the group consisting of ethylene/phthalic anhydride copolymer, ethylene/maleic anhydride copolymer, isobutylene/maleic anhydride copolymer, styrene/maleic anhydride copolymer, methyl vinyl ether/phthalic anhydride copolymer, and methyl vinyl ether/maleic anhydride copolymer.

10. The aqueous emulsion composition according to claim 1, wherein the cyclic acid anhydride is a monocyclic acid anhydride.

11. The aqueous emulsion composition according to claim 1, wherein the cyclic acid anhydride is a heterocyclic acid anhydride.

12. The aqueous emulsion composition according to claim 1, wherein the cyclic acid anhydride is a polymeric cyclic anhydride.

* * * * *